United States Patent [19]

Anderson

[11] 4,014,556
[45] Mar. 29, 1977

[54] SEALING RING MEANS FOR PIPE COUPLINGS
[75] Inventor: Richard H. Anderson, Dover, Ohio
[73] Assignee: Clow Corporation, Oak Brook, Ill.
[22] Filed: Mar. 3, 1976
[21] Appl. No.: 663,255
[52] U.S. Cl. .......................... 277/181; 277/DIG. 2; 285/230
[51] Int. Cl.² ....................................... F16J 15/10
[58] Field of Search ............ 277/207, DIG. 2, 181, 277/182, 186; 285/55, 230, 231, 345, 351

[56] References Cited
UNITED STATES PATENTS

| 2,809,853 | 10/1957 | Nathan | 277/207 A |
| 3,064,983 | 11/1962 | Halterman | 277/207 A |
| 3,493,236 | 2/1970 | Kleindienst | 277/207 A |

Primary Examiner—Robert I. Smith
Attorney, Agent, or Firm—Fitch, Even, Tabin & Luedeka

[57] ABSTRACT

A Y-shaped sealing ring gasket for use in sealing the coupled ends of pipe lengths is disclosed wherein the sealing ring gasket is secured within a bell end or coupling collar on one end of a pipe and is adapted to be deformed by the spigot end of a pipe received within the bell or collar to form a seal affording increased sealing pressure when the sealing ring is subjected to hydrostatic pressure.

10 Claims, 3 Drawing Figures

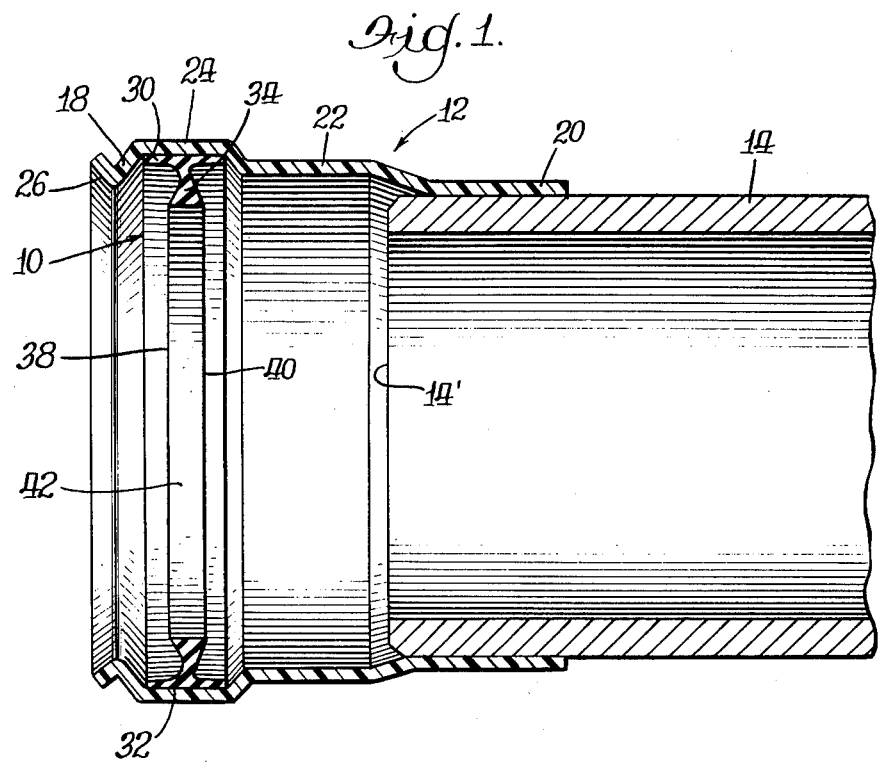
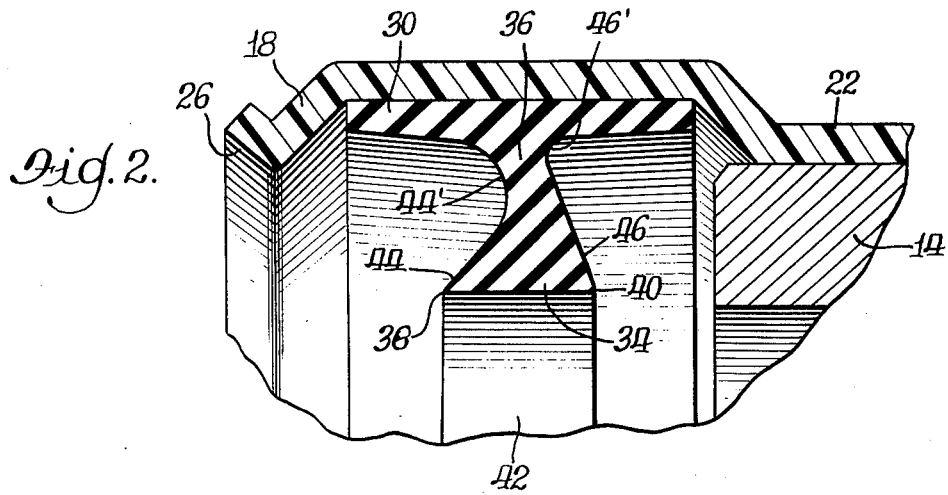
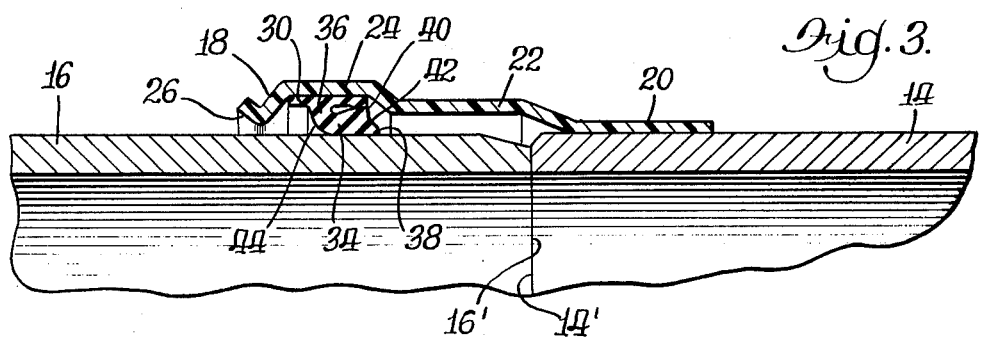

SEALING RING MEANS FOR PIPE COUPLINGS

The present invention relates generally to means for sealing the coupled ends of lengths of pipe, and more particularly to a novel sealing ring gasket adapted to be secured within a bell end or coupling sleeve on a pipe length and effect sealing engagement with the spigot end of a similar size pipe received within the collar.

It is common practice in laying pipe lines, such as in sewer systems and the like, to provide a plurality of finite lengths of pipe which are coupled in end-to-end relation. Such pipes, which may be made of clay, asbestos cement, plastic, cast iron, steel or other suitable materials, generally approach 4-10 inches in diameter and often may be of larger size. It has been a common practice to provide each length of pipe with an enlarged bell end and a spigot end, the bell end receiving the spigot end of a similar pipe when coupled end-to-end therewith. An alternative form of coupling means for sealingly securing pipes of similar size in end-to-end relation eliminates the bell-shaped end on each length of pipe and provides an annular coupling element or sleeve on one end of a cylindrical pipe to receive the spigot end of a similarly shaped pipe. See, for example, U.S. Pat. No. 3,848,904, dated Nov. 19, 1974, and assigned to the assignee of the present invention.

In connecting lengths of pipe of the traditional bell end configuration in end-to-end relation, a packing or sealing gasket member must generally be provided between the coupled pipe ends to prevent leakage both from and into the pipes. In pipe couplings of the type disclosed in the aforenoted U.S. Pat. No. 3,848,904, an annular sealing band may be affixed on the spigot end of each pipe length and cooperates with the coupling sleeve into which the spigot end is inserted to form a liquid tight seal between the coupled ends of the joined pipe lengths. The tolerances which must be maintained in the manufacture of pipe to insure good sealing with known sealing ring gaskets between coupled pipe lengths, when using either the bell end or coupling sleeve method of coupling, are not always economically achievable, particularly when working with pipe of approximately 4-10 inch diameter or greater. In either case, the out of round tolerances of the spigot ends of the pipes may vary significantly so that substantial clearance may exist between the outer surface of the spigot end of a pipe and the bell end or coupling sleeve into which it is received. While it is known to employ "O" ring seals between mating ends of coupled pipes, "O" rings of conventional size and weight are generally not suitable for sealing the connected ends of pipes where the dimensional clearance between the outer surface of the spigot end of a pipe and the inner surface of the bell end or coupling sleeve approaches approximately 0.20 inch, with the result that seepage may occur.

One of the primary objects of the present invention is to provide a novel sealing ring gasket for use in sealing the coupled ends of lengths of pipe.

Another object of the present invention is to provide an annular sealing ring gasket which has a novel "Y" transverse configuration and which is adapted to be affixed within the bell end or coupling sleeve on a length of pipe so as to be deformed by the spigot end of a pipe during coupling and establish a liquid tight hydraulic lip seal action against the surface of the mating pipe.

A further object of the present invention is to provide a collar assembly for use in coupling lengths of cylindrical tubular pipe, which collar assembly is adapted for mounting on the end of a pipe and includes a novel Y shaped sealing ring gasket which facilitates liquid tight sealing between the coupling sleeve and the spigot and of a pipe having substantially greater out-of-round dimensional tolerance than has heretofore been possible.

Further objects and advantages of the present invention, together with the organization and manner of operation thereof, will become apparent from the following detailed description of the invention when taken in conjunction with the accompanying drawing wherein like reference numerals designate like elements throughout the several views, and wherein:

FIG. 1 is a longitudinal sectional view of a portion of a pipe having a coupling collar and associated sealing ring gasket mounted thereon in accordance with the present invention;

FIG. 2 is an enlarged partial sectional view of the coupling collar and sealing gasket shown in FIG. 1; and FIG. 3 is a partial longitudinal sectional view showing the spigot end of a mating pipe received within the coupling collar and deforming the sealing ring gasket.

Referring now to the drawing, and in particular to FIG. 1, a sealing ring gasket constructed in accordance with the present invention in indicated generally at 10. In the illustrated embodiment, the sealing ring gasket 10 is shown as forming a portion of a collar assembly, indicated generally at 12, which is secured on the end of a length of pipe, a portion of which is indicated at 14. The pipe 14 may comprise a pipe suitable for use in a sewer system or other liquid transporting pipe system. The pipe 14 may be made of any material suitable for the transportation of liquid and the like.

In the illustrated embodiment, the pipe 14 comprises a cylindrical tubular pipe one end of which has the collar assembly 12 secured thereon and the other end of which comprises the spigot end of the pipe. In making up a liquid flow system, the pipes 14 are laid in end-to-end relation with the spigot end of one pipe being received within the collar assembly 12 of another pipe. FIG. 3, to be described more fully hereinbelow, illustrates the pipe 14 coupled to the spigot end 16 of a similar size pipe having its end surface 16' abutting the end surface 14' of pipe 14. The collar assembly 12 thus facilitates coupling of a first pipe or annular member 14 to the spigot end of a second pipe or annular member 16.

The coupling assembly 12 includes an annular coupling collar or sleeve 18 which is made from an elastomeric material and preferably a thermoplastic material which exhibits the characteristic of "thermalmemory". The annular collar 18 has a rearward end portion 20, termed the pipe mounting end, which is formed with a diameter slightly smaller than the outer diameter of the tubular pipe 14 upon which the sleeve 18 is to be mounted. The collar 18 has an opposite end portion 22 adapted to extend forwardly from the end of the pipe 14 when the collar assembly 12 is mounted thereon. The end portion 22 has a larger inner diameter than the end portion 20 and is further formed with an annular radial recess 24 therein within which is secured the sealing ring gasket 10. The forwardmost end of the coupling collar 18 is formed with an outward conical bevel or chamfer 26 to facilitate entry of the spigot end of a mating pipe when inserted within the collar assembly 12. The manner of making the annular collar of sleeve 18 and assembling it on an end of a pipe such as 14 is more fully disclosed in the aforenoted U.S. Pat. No. 3,848,904 which is incorporated herein by reference. Briefly, when one is ready to install the annular coupling sleeve 18, the pipe mounting end portion 20 is suitably heated to bring its temperature to its thermoplastic range whereafter the end 20 is pushed over the end of the pipe 14 to a position as shown in FIG. 1 and then allowed to cool. The end portion 20 of the annular collar is preferably forcibly expanded to match the external surface of the end of pipe 14 during the mounting process and, upon cooling, shrinkage occurs as a result of the "thermalmemory" of the material causing it to shrink tightly about the peripheral surface of the pipe 14. Preferably, and adhesive sealer is precoated upon the end of the pipe 14 so that a leak-proof joint is accomplished.

The sealing ring gasket 10 is made of a suitable resilient material; for example, an elastomeric material such as natural of synthetic rubber. With particular reference to FIG. 2, taken in conjunction with FIGS. 1 and 3, the sealing ring gasket 10 has a first portion 30 which takes the form of an annular flange or band. The flange portion 30 has an outer peripheral surface 32 the diameter of which is slightly greater than the diameter of the inner surface of the radial recess 24 in the coupling collar 18 so that when the ring gasket is assembled within the collar 18 the gasket will be under slight radial compression. The outer surface 32 of the flange portion 30 is secured within the annular recess 24 through a suitable adhesive such as epoxy or glue.

The sealing ring gasket 10 includes a second annular portion in the form of a radially inwardly directed sealing portion 34 which has an inverted substantially Y-shaped transverse configuration, thus giving the gasket 10 what is termed a Y-shape. The inverted "Y" configuration of the sealing portion 34 may be said to comprise a substantially triangular transverse section with one corner portion thereof forming a connecting web 36 which integrally connects the sealing portion 34 to the annular flange portion 30 at substantially the midpoint of the axial width of the flange portion. The two remaining corner edges 38 and 40 of the triangular shaped sealing portion 34 of gasket 10 comprise a pair of parallel annular sealing edges which are interconnected by a cylindrical web surface 42 the axis of which coincides with the axis of the annular coupling collar 18.

The inverted "Y" or triangular sealing portion 34 of the gasket 10 defines annular side surfaces 44 and 46 between the sealing edges 38 and 40, respectively, and the flange portion 30. The side surfaces 44 and 46 have annular concave surface portions 44' and 46', respectively, adjacent the flange 30, the concave curved surfaces 44' and 46' having radii of different magnitude with the curved surface 44' having a greater radius and facing toward the beveled end 26 of the annular sleeve 18 which receives the spigot end of a pipe therein.

The radial thickness of the sealing ring gasket 10, considered in the plane of FIG. 2 as the dimension between the annular surfaces 32 and 42, is sufficient to insure that the sealing portion 34 extends radially inwardly from the inner surface of the coupling sleeve portion 22 sufficiently to be engaged and deformed by the pipe spigot end 16 when inserted within the coupling sleeve 18. With particular reference to FIG. 3, when the spigot end of a pipe, such as 16, is inserted within the collar assembly 12, the forward end 16' of the spigot end engages the radially inwardly directed sealing portion 34 of the sealing ring gasket and deforms it to a configuration as shown in FIG. 3. In this deformed configuration, the sealing portion 34 is resiliently biased against the peripheral surface of the spigot end 16 and the annular sealing edge 38 forms a liquid tight lip seal against the peripheral surface of the spigot end. Simultaneously, the annular side surface 46 is caused to at least partially engage the opposing inner surface of the flange 30 in compressed relation thereagainst. Depending upon the outer dimensional tolerance of the spigot end 16, the triangular sealing portion 34 may be substantially totally compressed against the opposing inner surface of the annular flange 30 so as to form a compressed mass of sealing material.

With the pipes 14 and 16 coupled end to end as described, and with the sealing ring gasket 10 deformed in sealing relation with the spigot end 16, fluid pressure that may seep through the innerface of the ends 14' and 16' of the coupled pipes will act against the surface 42 of the sealing ring gasket and urge the annular sealing edge 38 into increased sealing pressure contact against the peripheral surface of the spigot end 16. Thus, the sealing edge 38 forms a liquid tight hydraulic lip seal against the peripheral surface of the pipe 16 such that an increase in fluid pressure acting on the sealing portion 34 in the direction of the receiving end 26 of the collar assembly 12 increases the sealing force applied against the pipe 16.

While the sealing ring gasket 10 has been described in conjunction with the annular collar or sleeve 18 which is separable from the cylindrical pipe 14 but which is secured on the end of the cylindrical pipe 14, it will be appreciated that the annular sleeve 18 may form an integral end of a suitable thermoplastic pipe which has an end formed into the configuration of the coupling sleeve 18. The sealing ring gasket 10 would then be adhesively secured within the annular recess in the formed end of the plastic pipe to sealingly engage the spigot end of a similar size pipe received therein.

It will also be understood that the annular sleeve 18 may have opposite ends formed in the configuration of the end 22 so that each end is adapted to receive a sealing ring gasket 10 therein. In this manner, a pipe coupling is provided for coupling cylindrical tubular pipes in end to end relation.

The pipe 14 may also comprise a clay or cast iron pipe of the type conventionally employed in sewer pipe systems which has a bell-shaped end to receive the spigot end of a similar shaped pipe. In this alternative embodiment, the sealing ring gasket 10 would be affixed within the enlarged diameter bell end of the pipe, which need not necessarily have an internal annular recess therein to receive the ring gasket, for sealing engagement with the spigot end of a similar pipe received within the bell end when the pipes are coupled in end-to-end relation.

It has been found that the sealing ring gasket 10 as hereinabove described exhibits improved ability to compensate for dimensional variances in pipes being connected end-to-end using minimum material weight for the gasket. For example, it has been found that a conventional 8 inch rubber "0" ring weighing 124 grams will allow a maximum dimensional variance of 0.12 inch between two sealing surfaces and still provide an adequate liquid-tight seal to prevent water passage. An 8 inch "Y" sealing ring gasket in accordance with the present invention and weighing 124 grams will allow a dimensional variance of 0.20 inch between two sealing surfaces and still maintain a liquid-tight seal preventing water passage therethrough. This improved sealing is achieved because the triangular or inverted "Y" shaped sealing portion 34 of the ring gasket is deflected and annular sealing edge thereof is compressed into lip sealing relation with the peripheral surface of the male or spigot end of a pipe when inserted into the coupling assembly 12 in forming a pipe joint. As the hydrostatic pressure acting on the sealing ring gasket of the present invention increases, the sealing force of the lip seal edge against the spigot and of the mating pipe is also increased.

Having thus described a preferred embodiment of the sealing ring gasket 10 and its combination in the collar assembly 12, it will be understood that changes and modifications may be made therein without departing from the invention in its broader aspects. Various features of the invention are defined in the following claims.

What is claimed is:

1. A sealing gasket for use in effecting a liquid tight seal between a first annular member and a second annular member adapted to be coaxially disposed within said first annular member in radially spaced relation therefrom, said gasket including an annular flange portion adapted to be secured to the inner peripheral surface of said first annular member, said gasket further having an annular sealing portion secured to and extending radially inwardly from said flange portion, said sealing portion having a substantially triangular transverse section configuration when said sealing portion is in a relaxed condition, said sealing portion being secured to said flange portion at one corner edge of said substantially triangular section and defining a pair of resilient parallel annular sealing edges of substantially equal diameter, said gasket having a radial thickness greater than the radial spacing between said first and second annular members when disposed in said coaxial relation so that placement of said first and second annular members in said coaxial relation with said flange portion of said sealing gasket secured to the inner peripheral surface of said first annular member will effect resilient biasing of said sealing portion against the peripheral surface of said second annular member with at least one of said annular sealing edges forming a liquid tight lip seal against said peripheral surface of said second annular member.

2. A sealing ring gasket as defined in claim 1 wherein said sealing portion of said ring gasket is of sufficient radial size to be deformed by said second annular member when disposed in said coaxial relation with said first annular member so that said sealing portion is biased against said flange portion when said second annular member is disposed in said coaxial relation with said first annular member.

3. A sealing ring gasket as defined in claim 1 wherein said pair of parallel annular sealing edges are interconnected by a generally cylindrical web surface the axis of which coincides with the axis of said annular collar when said ring gasket is in a free nondeformed condition.

4. The sealing ring gasket as defined in claim 1 wherein said annular flange portion of said gasket forms an annular generally flat flange, said sealing portion being connected to said flange portion at substantially the midpoint of its axial width.

5. A sealing gasket as defined in claim 1 wherein said ring gasket further defines annular side surfaces between said sealing edges and said annular flange portion of said gasket, said side surfaces having annular concave curved surface portions which are disposed adjacent said annular flange portion of said gasket and are defined by radii of different magnitude, the concave curved surface of larger radii facing toward the direction from which said second annular member is inserted into said first annular member when effecting said coaxially disposed relationship therebetween.

6. A collar assembly for use with a first pipe to facilitate coupling to the spigot end of a second pipe, said collar assembly comprising, an annular collar having an end portion adapted to be affixed on an end of said first pipe, said collar having an opposite end portion adapted for extension outwardly from said end of said first pipe when mounted thereon, and an annular sealing ring gasket having an annular flange portion secured to said collar within said opposite end portion, said gasket including a resilient annular sealing portion secured to and extending radially inwardly from said flange portion, said annular sealing portion having a substantially triangular transverse configuration when said sealing portion is in a relaxed condition and being secured to said flange portion at one corner of said substantially triangular section, said sealing portion defining a pair of parallel annular sealing edges of substantially equal diameter, said sealing portion extending radially inwardly from said annular flange portion a distance sufficient to be engaged by the spigot end of said second pipe when inserted within said opposite end of said collar so that said substantially triangular sealing portion is resiliently biased against the peripheral surface of said spigot end with at least one of said annular sealing edges forming a liquid tight lip seal against said peripheral surface of said spigot end.

7. A collar assembly as defined in claim 6 wherein said substantially triangular sealing portion of said ring gasket is of a size sufficient to cause said substantially triangular sealing portion to be deformed by said spigot end of said second pipe when inserted within said opposite end of said collar so that said sealing portion is compressed against said annular flange portion of said gasket.

8. A collar assembly as defined in claim 6 wherein said pair of parallel annular sealing edges are interconnected by a generally cylindrical web surface the axis of which substantially coincides with the axis of said annular collar when said gasket is in a free condition.

9. A collar assembly as defined in claim 6 wherein said opposite end of said collar has an annular radial recess formed therein, and wherein said annular flange portion of said ring gasket comprises an annular generally flat band secured within said radial recess, said resilient sealing portion being connected to said band at substantially the midpoint of its axial width.

10. A collar assembly as defined in claim 6 wherein said ring gasket further defines annular side surfaces between said sealing edges and said annular flange portion thereof, said side surface having annular concave curved surface portions adjacent said annular flange portion of said gasket defined by radii of different magnitude, the concave curved surface of larger radii facing toward the end of said collar which receives said spigot end of said second pipe therein when coupled to said first pipe.

* * * * *

UNITED STATES PATENT AND TRADEMARK OFFICE
CERTIFICATE OF CORRECTION

PATENT NO. : 4,014,556
DATED : March 29, 1977
INVENTOR(S) : Richard H. Anderson

It is certified that error appears in the above-identified patent and that said Letters Patent are hereby corrected as shown below:

Col. 1, line 10, after "is", insert the word --a--;

Col. 2, line 6, "and" (second occurrence) should be --end--;

Col. 2, line 68, "of" (second occurrence) should be --or--;

Col. 3, line 20, "of" should be --or--;

Col. 5, line 6, insert --an-- before "annular";

Col. 5, line 12, "and" should be --end--;

Col. 6, Claim 10, line 61, "surface" should be --surfaces--.

Signed and Sealed this twenty-third Day of August 1977

[SEAL]

Attest:

RUTH C. MASON
Attesting Officer

C. MARSHALL DANN
Commissioner of Patents and Trademarks